United States Patent [19]

Umegaki et al.

[11] Patent Number: 4,562,034
[45] Date of Patent: Dec. 31, 1985

[54] FAST BREEDER

[75] Inventors: Kikuo Umegaki, Hitachi; Kotaro Inoue, Ibaraki, both of Japan

[73] Assignee: Hitachi, Ltd., Tokyo, Japan

[21] Appl. No.: 506,867

[22] Filed: Jun. 22, 1983

[30] Foreign Application Priority Data

Jun. 23, 1982 [JP]   Japan .............................. 57-106856

[51] Int. Cl.[4] .............................................. G21G 1/06
[52] U.S. Cl. ..................................... 376/172; 376/171; 376/173
[58] Field of Search ........................ 376/171, 172, 173

[56] References Cited

U.S. PATENT DOCUMENTS 3,658,643  4/1972  Spenke .................................. 376/172
3,660,227  5/1972  Ackroyd ............................... 376/171

FOREIGN PATENT DOCUMENTS 54-142484   6/1979  Japan .................................. 376/172
55-160897  12/1980  Japan .................................. 376/173
1299038    12/1972  United Kingdom ................. 376/172

OTHER PUBLICATIONS

Inoue, et al., ANS Trans., vol. 33, (1979), pp. 862–863.
Waltar, et al., "Fast Breeder Reactors" Pergamon, (1981), pp. 35–43.
Kato, et al., ANS Trans., 1977 Annual Meeting, pp. 552–562.

*Primary Examiner*—Donald P. Walsh
*Attorney, Agent, or Firm*—Antonelli, Terry & Wands

[57] ABSTRACT

A fast breeder has a driver core region enriched with a fissile material and a blanket core region containing mainly a fertile material. The driver core region includes an inner core region and an outer core region surrounding the inner core region. The volume of the inner core region is selected to range between 30 and 70% of the volume of the driver core region. The enhancement of the fissile material in the inner core region ranges between 30 and 80% of the fissile material in the outer core region.

6 Claims, 7 Drawing Figures

FAST BREEDER

BACKGROUND OF THE INVENTION

The present invention relates to a fast breeder improved to exhibit a superior performance in the core region.

As well known to those skilled in the art, a fast breeder is a nuclear reactor in which neutrons generated by a fission in the reactor core are absorbed by a fertile material which in turn produces new fissile material. Thanks to this effect called "breeding", it is possible to make an efficient use of fuel.

The core of the nuclear reactor usually has a columnar construction consisting of a driver core region containing fissile material, and axial and radial blanket regions surrounding the driver core region and containing a fertile material. More specifically, the driver core region is loaded with a fuel which is usually an enriched uranium or an uranium enriched in plutonium, while the blanket regions are loaded with a fertile material such as natural uranium or depleted uranium. The fertile material captures the neutrons leaking from the reactor core to produce useful fissile material, i.e. plutonium.

In an ordinary core structure of fast breeder generally referred to as "homogeneous core" the core region is divided into a plurality of concentric parts: namely, an inner core region and an outer core region. In this type of core structure, the enhancement of fuel is higher in the outer core region than in the inner core region. The term "enhancement" is used to mean the ratio of the amount of fissionable material to the sum of the amount of fissionable material and the amount of fertile material.

In recent years, proposed is a core structure called "Parfait core" in which a flattened columnar internal blanket region of a constant thickness is disposed at the axially central portion of the core region of a fast breeder. For information, a reference shall be made to "Evaluation of the Parfait Blanket Concept for Fast Breeder Reactors", G. A. DUCAT et al., COO-2250-5, MITNE-157, Massachusetts Institute of Technology, January 1974.

Proposed also is a core construction for fast breeders in which an internal blanket region is disposed at an axially central portion of the core region as in the case of the Parfait core, wherein the axial thickness of the internal blanket region is reduced at the peripheral portion thereof. This type of core construction is disclosed in "A Fast Breeder Core With Internal Blanket", K. Inoue et al., American Nuclear Society Transactions, Vol. 33, pp. 862-863, 1979. In this core construction, the outer surface of the internal blanket region is held in contact with the inner surface of the radial blanket region.

SUMMARY OF THE INVENTION

Accordingly, an object of the invention is to provide a fast breeder which is improved to flatten the power distribution while realizing a compact construction of the reactor core.

To this end, according to the invention, there is provided a fast breeder having a driver core region containing fissile material and a blanket region surrounding the driver core region and consisting mainly of a fertile material, wherein the improvement comprises that the driver core region includes an inner core region and an outer core region surrounding the inner core region, the inner core region having a volume ranging between 30 and 70% of the volume of the driver core region and an enhancement of the fissile material ranging between 30 and 80% of that in the outer core region.

DESCRIPTION OF THE PREFERRED EMBODIMENTS

This invention has been accomplished through an intense study on the characteristics of conventional reactor cores of fast breeders, as well as the characteristics of fast breeders improved by the present inventors, i.e. Inoue et al. Before turning to the description of the preferred embodiments, an explanation will be made hereinunder as to the result of such study.

Generally, "breeding ratio" and "doubling time" are considered as being quantitative factors or indexes of the breeding. The breeding ratio is the ratio of the amount of newly produced fissile material to the amount of consumed fissile material and, hence, is preferably large. On the other hand, the doubling time is the time length required for the reproduction of the same amount of fissile material as that initially charged in the fast breeder. The doubling time, therefore, is preferably short.

It is not too much to say that the effort for improving fast breeders is concentrated on the shortening of the doubling time. Since the doubling time is proportional to the amount of fissile material initially charged in the fast breeder, the shortening of the doubling time can be attained by decreasing the amount of the initial charge and by increasing the power density (power produced by unit volume) of the fast breeder. On the other hand, the maximum thermal output obtainable from the driver core region depends on the thermal condition of the fuel rod or rods in the area where the reaction temperature takes the maximum level. For shortening the doubling time through an increase in the power density, therefore, it is effective to flatten the power density in the driver core region as much as possible. The flattened power density makes it possible to obtain an equal thermal output from a core of a reduced size, so that the building and instruction costs of the fast breeder, as well as the fuel cost, are decreased economically.

Figure 1:
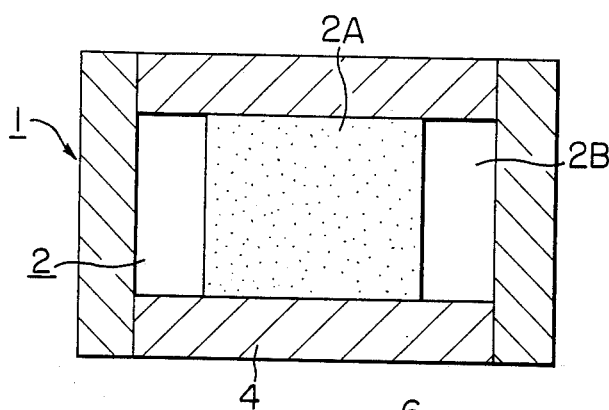
FIG. 1 is a schematic vertical sectional view of a homogeneous reactor core of a conventional fast breeder.

FIG. 1 shows a known homogeneous core of a fast breeder. In this homogeneous core, the driver core region 2 is divided in the radial direction into two concentric parts: namely, an inner region 2A and an outer region 2B. In another known homogeneous core, the driver core region is divided into three or more regions by providing an intermediate core region or regions between the inner region 2A and the outer region 2B. In these homogeneous cores, the aforementioned enhancement of the fuel is higher in the radially outer parts than in the radially inner parts of the driver core region. The homogeneous core shown in FIG. 1 has a radial blanket region 3 and axial blanket regions 4.

It is true that this homogeneous core achieves a flattening of the output in the radial direction, but the power distribution cannot be flattened in the axial direction because the enhancement of the fuel is uniform along the axis of the driver core region.

Figure 2:
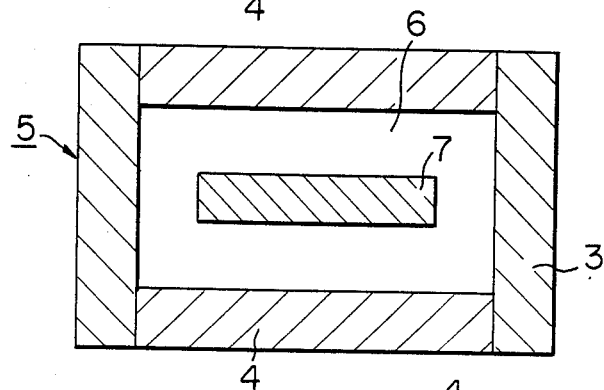
FIG. 2 is a schematic vertical sectional view of a known Parfait core of a fast breeder.

In another known type of reactor core referred to as "axially heterogeneous core", an internal blanket region consisting of a fertile material is provided in the driver core region, in order to flatten the axial power distribution. More specifically, in this axially heterogeneous core, a blanket fuel containing no fissile material is disposed at the axially central portion of the driver core. A typical example of this axially heterogeneous core is the Parfait core mentioned before. As shown in FIG. 2, the Parfait core 5 has a thin columnar internal blanket region 7 disposed at the axially central portion of the driver core region 6.

Figure 3:
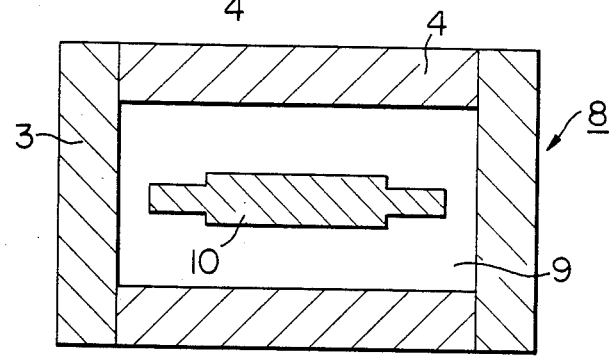
FIG. 3 is a schematic vertical sectional view of an axially heterogeneous reactor core of the type shown in FIG. 16 of the U.S. patent application Ser. No. 339,894.

FIG. 3 shows an axially heterogeneous core 8 proposed by Inoue et al. to eliminate the drawbacks of the Parfait core 5. This axially heterogeneous core 8 is shown in FIG. 16 attached to the specification of the U.S. patent application Ser. No. 339,894. This axially heterogeneous core 8 has an internal blanket region 10 disposed in the driver core region. Unlike the internal blanket region 7 in the Parfait core 5 having a uniform axial thickness, however, the internal blanket region 10 of this axially heterogeneous core does not have uniform axial thickness. Namely, the axial thickness of the internal blanket region is greater than in the radially central portion than in the peripheral portion of the same. The internal blanket region 10 is charged with a blanket fuel such as natural uranium, while the driver core region 9 is loaded with fuel enriched in plutonium.

The axially heterogeneous cores shown in FIGS. 2 and 3 can advantageously flatten the power distribution particularly in the axial direction over the homogeneous core 1 explained before.

In the axially heterogeneous core, however, the power density in the internal blanket region is as small as about $\Delta$ of that in the driver core region, even after the burn-up of the fuel to the state of equilibrium core. For this reason, in the axially heterogeneous core, a higher power density is developed in the driver core region except the internal core region than in the homogeneous core. In fact, as the volumetric ratio of the internal blanket region to the driver core region is increased to exceed 20%, the effect of the internal blanket region for suppressing the maximum power density, i.e. the product of the power peaking factor and the power density in the driver core, is impaired disadvantageously.

The present inventors have made an intense study to seek for effective solution to this problem and found that the above-mentioned problem can be overcome by enriching the internal blanket region of an axially heterogeneous core with fissile material to make this region serve as a part of the driver core region. The present invention, which is a fruit of the study, will be more fully understood from the following description of the preferred embodiments.

Figure 4:
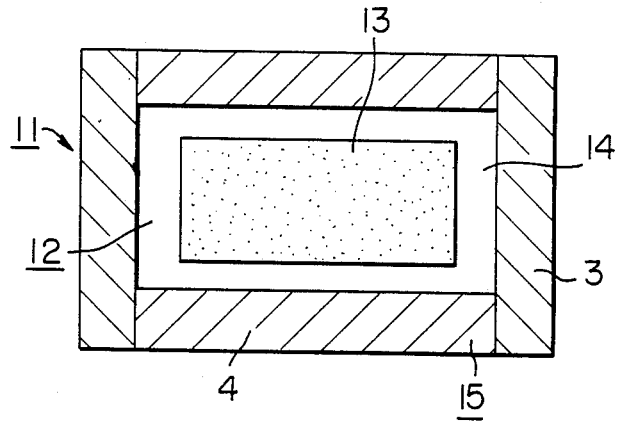
FIG. 4 is a schematic vertical sectional view of the core structure of a fast breeder in accordance with a preferred embodiment of the invention.

FIG. 4 shows the reactor core of a fast breeder in accordance with a preferred embodiment of the invention. The reactor core 11 is constituted by a driver core region 12 and a blanket region 15 surrounding the driver core region 12. The blanket region 15 is composed of a radial blanket region 3 and axial blanket regions 4. The driver core region 12 is divided into an inner core region 13 and an outer core region 14 surrounding the inner core region 13. Both of the inner core region 13 and the outer core region 14 are enriched with plutonium as a fissile material. The enhancement of plutonium in the inner core region 13 is smaller than that in the outer core region 14.

The reactor core of the fast breeder of this embodiment is discriminated from the conventional homogeneous reactor core by the fact that the driver core region is divided also in the axial direction into two regions of different degrees of enhancement thereby to flatten the axial power distribution. This reactor core is discriminated from the known heterogeneous cores shown in FIGS. 2 and 3 in that a region of a low enhancement charged with a fissile material is disposed at an axially central portion of the driver core region. According to this arrangement, a flat power distribution is attained by selecting the volumetric ratio of the inner core region 13 to the driver core region 12 to range between 30 and 70%, while selecting the plutonium enhancement in the inner core region to range between 30 and 80% of that in the outer core region 14. Furthermore, in the described embodiment, it is possible to reduce the volume of the driver core region 12 in the blanket region 15 as compared with the volumes of the driver core regions (including internal blanket in the core structures shown in FIGS. 2 and 3) in the blanket regions of the core structures shown in FIGS. 1 to 3. Since the thicknesses of the blanket regions in the illustrated prior arts and in the described embodiment of the invention are materially equal, it is possible to reduce the size of the reactor core 11 as a whole in the described embodiment of the invention as compared with the prior arts shown in FIGS. 1 to 3.

Figure 5:
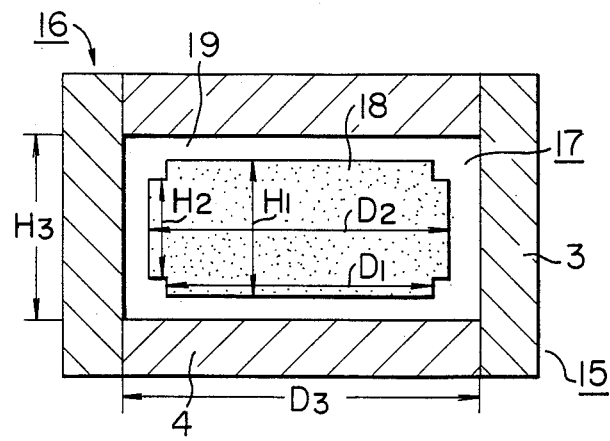
FIG. 5 is a schematic vertical sectional view of the reactor core of a fast breeder in accordance with another embodiment of the invention.

FIG. 5 shows a reactor core of a fast breeder in accordance with another embodiment of the invention. The reactor core 16 has a driver core region 17 surrounded by a blanket region 15. The driver core region 17 is composed of an inner core region 18 and an outer core region 19 surrounding the region 18. The axial thickness of the inner core region 18 is greater at the radially inner part than at the peripheral part thereof. As to the diameter of the core region 18, the diameter $D_1$ of thicker part of the inner core region 18 is 75% of the diameter $D_3$ of the driver core region 17, while the diameter $D_2$ of the thinner part of the inner core region 18 is 83% of the diameter $D_3$. The axial thickness or height $H_1$ of the central part of the inner core region 18 is 75% of the height $H_3$ of the driver core region 17, while the thickness $H_2$ of the peripheral part of the inner core region 18 is 50% of the height $H_3$. Thus, the volume of the inner core region 18 occupies about 50% of the whole driver core region 17. The enhancement of the fissile material (sum of Pu-239 and Pu-241) is 10% in the inner core region 18 and 16% in the outer core region 19. According to this core arrangement, the power distribution is further flattened as compared with each of the reactor cores shown in FIGS. 1 to 3 to permit a further reduction in the maximum power density.

An explanation will be made hereinunder as to the flattening of power distribution attained in the reactor core 16 of this embodiment. Design parameters and operating conditions of the reactor core 16 are shown in Table 1 below. Namely, the thermal output and the electric output are 2500 MW and 1000 MW, respectively. The diameter and the height of the equivalent driver core region are 325 cm and 100 cm, respectively. The thicknesses of the axial blanket and the thickness of the radial blanket are 35 cm and 40 cm, respectively. The period of renewal of fuel is 1 year and the utilization factor or plant factor is 80%. The number of batch of fuel renewal is 3 in both of the driver core region and the blanket region.

TABLE 1

Principal Design Parameters of Reactor Core

| Items | | Specification |
|---|---|---|
| Thermal output of reactor | MW | Approx. 2500 |
| Diameter/Height of Driver core region | cm | 325/100 |
| Thickness of Blanket Region (radial direction/ axial direction) | cm | 40/35 |
| Volume of driver core region | l | 8300 |
| Composition ratio by volume (fuel/coolant/structure) | % | |
| Driver core region/Axial blanket region | | 40.5/37.1/22.4 |
| Radial blanket region | | 50.5/31.1/18.4 |
| fuel (driver core region/blanket region) | | $PuO_2$—$UO_2$/ depleted $UO_2$ |
| Fuel smear density theoretical value % (driver core region, axial blanket region) | | 90 |
| (radial blanket region) | | 91 |
| Fuel exchanging period | (year) | 1 |
| Plant factor | % | 80 |
| Number of batches of fuel exchange | | 3 |

Table 2 shows the maximum power density attained in the equilibrium cycle of the reactor core of the invention (FIG. 5) determined by the design parameters shown in Table 1, in comparison of those of the homogeneous core 1 (FIG. 1) and the axially heterogeneous core 8 (see FIG. 3). The design parameters and operating conditions for the homogeneous core 1 and the axially heterogeneous core 8 are same as those shown in Table 1.

As will be understood from Table 2, it will be understood that the reactor core 16 of this embodiment achieves about 13% reduction in the maximum power density as compared with the homogeneous core 1 and about 7% reduction in the same as compared with the axially heterogeneous core 8.

TABLE 2

Maximum Power Densities of Equilibrium Cycles of Reactor Cores (Unit W/cc)

| type of reactor core | beginning of cycle | mid portion of cycle | end of cycle |
|---|---|---|---|
| homogeneous core 1 (FIG. 1) | 423 | 426 | 427 |
| axially heterogeneous core 8 (FIG. 3) | 393 | 388 | 397 |
| reactor core of invention 16 (FIG. 5) | 371 | 359 | 369 |

Figure 6:
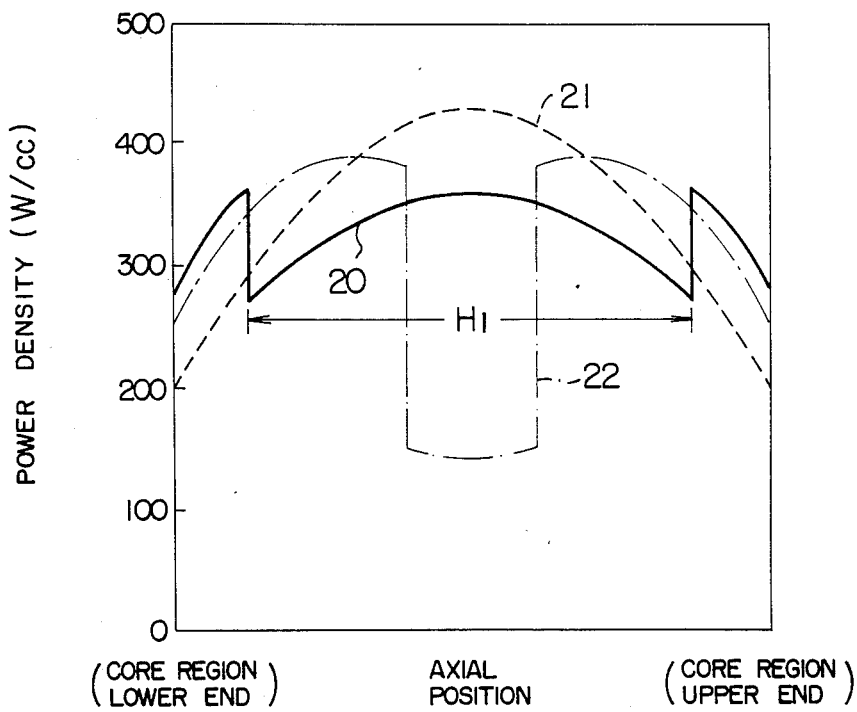
FIG. 6 is a diagram showing the axial power distributions in the reactor cores shown in FIGS. 1, 3 and 5.

FIG. 6 shows the axial power distributions at the radially central parts of the reactor cores. More specifically, the full-line curve 20 shows the axial power distribution in the reactor core 16 of the described embodiment, while broken-line curve 21 and the chain-line curve 22 represent, respectively, axial power distributions in the homogeneous core 1 shown in FIG. 1 and in the axially heterogeneous core 8 shown in FIG. 3. From this Figure, it will be understood that the axial power distribution in the reactor core of the embodiment is appreciably flattened as compared with those in other two types of reactor core.

Figure 7:
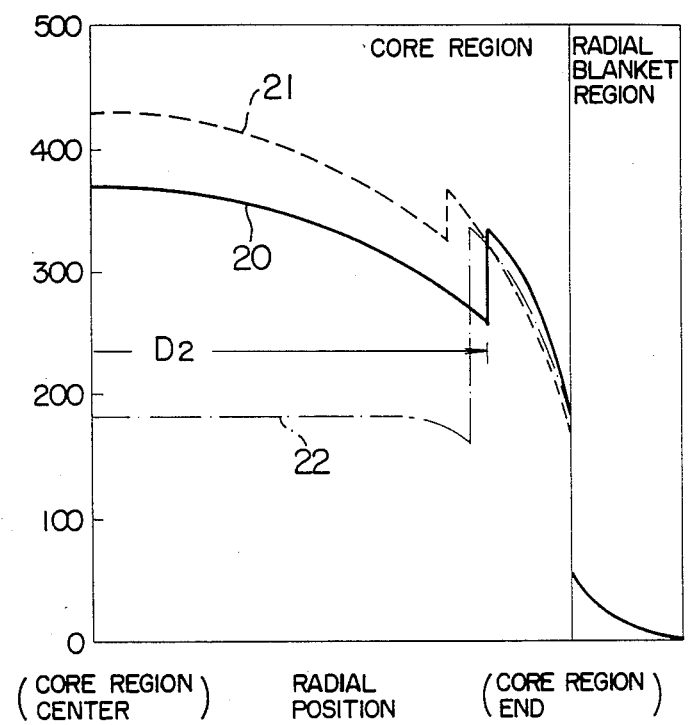
FIG. 7 is a diagram showing radial power distributions in the reactor cores shown in FIGS. 1, 3 and 5.

FIG. 7 shows the radial power distributions in the reactor core 16 of the embodiment (shown by full-line curve 20), homogeneous core 1 (shown by broken-line curve 21) and the axially heterogeneous core 8 (shown by chain-line curve 22), as observed at the axially central portion of the reactor cores. It will be seen that the reactor core 16 of this embodiment provides upwardly convexing power distribution curves both in axial and radial directions.

In general, the maximum allowable power of a fast breeder is ruled by the maximum power density, more specifically by the maximum linear output of the fuel pin. For attaining a given thermal output, the flat power distribution correspondingly decreases the number of fuel assemblies to be loaded in the reactor core. In other words, the flat power distribution permits a reduction in the volume of the driver core region. Table 3 shows, from this point of view, the volume and the core characteristics of the driver core region of the reactor core 16 of the embodiment shown in FIG. 5, in comparison with those of the homogeneous core 1 shown in FIG. 1 and the axially heterogeneous core 8 shown in FIG. 3. As will be understood from Table 3, the reactor core 16 of the described embodiment shows about 14% reduction in the volume of the driver core region as compared with the homogeneous core 1 and about 8% reduction in the same as compared with the axially heterogeneous core 8.

TABLE 3

Volume of Core Regions and Core Characteristics (Thermal output 2500 MW, Max. power density 430 W/cc)

| type of reactor core | core volume (l) | inventory of fissile plutonium (tons) | breeding ratio | doubling time (year) |
|---|---|---|---|---|
| homogeneous core 1 (FIG. 1) | 8200 | 3.4 | 1.26 | 19 |
| axially heterogeneous core 8 (FIG. 3) | 7700 | 3.4 | 1.29 | 17 |
| reactor core of | 7100 | 3.2 | 1.28 | 17 |

TABLE 3-continued

Volume of Core Regions and Core Characteristics
(Thermal output 2500 MW, Max. power density 430 W/cc)

| type of reactor core | core volume (l) | inventory of fissile plutonium (tons) | breeding ratio | doubling time (year) |
|---|---|---|---|---|
| invention 16 (FIG. 5) | | | | |

(Volume of driver core region of axially heterogeneous core 8 includes volume of the internal blanket region.)

In addition, the inventory or amount of charge of plutonium as the fissile material is reduced by about 6%. Furthermore, the doubling time is decreased by about 10% as compared with the homogeneous core 1. Namely, the doubling time in the reactor core 16 of the described embodiment is as short as that in the axially heterogeneous core 8.

In the reactor core shown in FIG. 5 also, it is possible to flatten the power distribution and, hence, to decrease the volume of the core region, by selecting the volume of the inner core region 18 to range between 30 to 70% of the driver core region 17 and selecting the plutonium enhancement in the inner core region 18 to range between 30 and 80% of the plutonium enhancement in the outer core region 19.

In the reactor core shown in FIG. 4, the radial power distribution curve and axial power distribution curve are convexed upwardly as in the case of the reactor core shown in FIG. 5.

As has been described, according to the invention, it is possible to flatten the power distribution in the core region and to decrease the size of the reactor core advantageously.

What is claimed is:

1. A fast breeder comprising a core including a driver core region containing Pu-fissile material and a blanket region surrounding said driver core region, said blanket region containing a fertile material as a main component, said driver core region including an inner core region uniformly enriched with Pu-fissile material and an outer core region uniformly enriched with Pu-fissile material, said outer core region being disposed between said inner core region and said blanket region in axial and radial direction of said core so as to surround said inner core region, said inner core region having a volume of between 30 and 70% of the volume of said driver core region, and said inner core region having an enhancement of Pu-fissile material of between 30 and 80% of the enhancement of Pu-fissile material in said outer core region.

2. A fast breeder comprising a core including a driver core region containing Pu-fissile material and a blanket region surrounding said driver core region, said blanket region containing a fertile material as a main component, said driver core region including an inner core region uniformly enriched with Pu-fissile material and an outer core region uniformly enriched with Pu-fissile material, said outer core region being disposed between said inner core region and said blanket region in axial and radial directions of said core so as to surround said inner core region, and said inner core region having respective power distributions in the axial and radial directions of said core so as to have a larger power at the central portion of said inner core region and a small power in the vicinity of the boundary between said inner core region and said outer core region.

3. A fast breeder according to claim 1, wherein said inner core region has a uniform axial thickness.

4. A fast breeder according to claim 1, wherein the axial thickness of said inner core region is larger at the central part than at the peripheral part thereof.

5. A fast breeder according to claim 2, wherein said inner core region has an uniform thickness in the axial direction.

6. A fast breeder according to claim 2, wherein the axial thickness of said inner core region is larger at the central part than at the peripheral part of the same.

* * * * *